Figure 1:
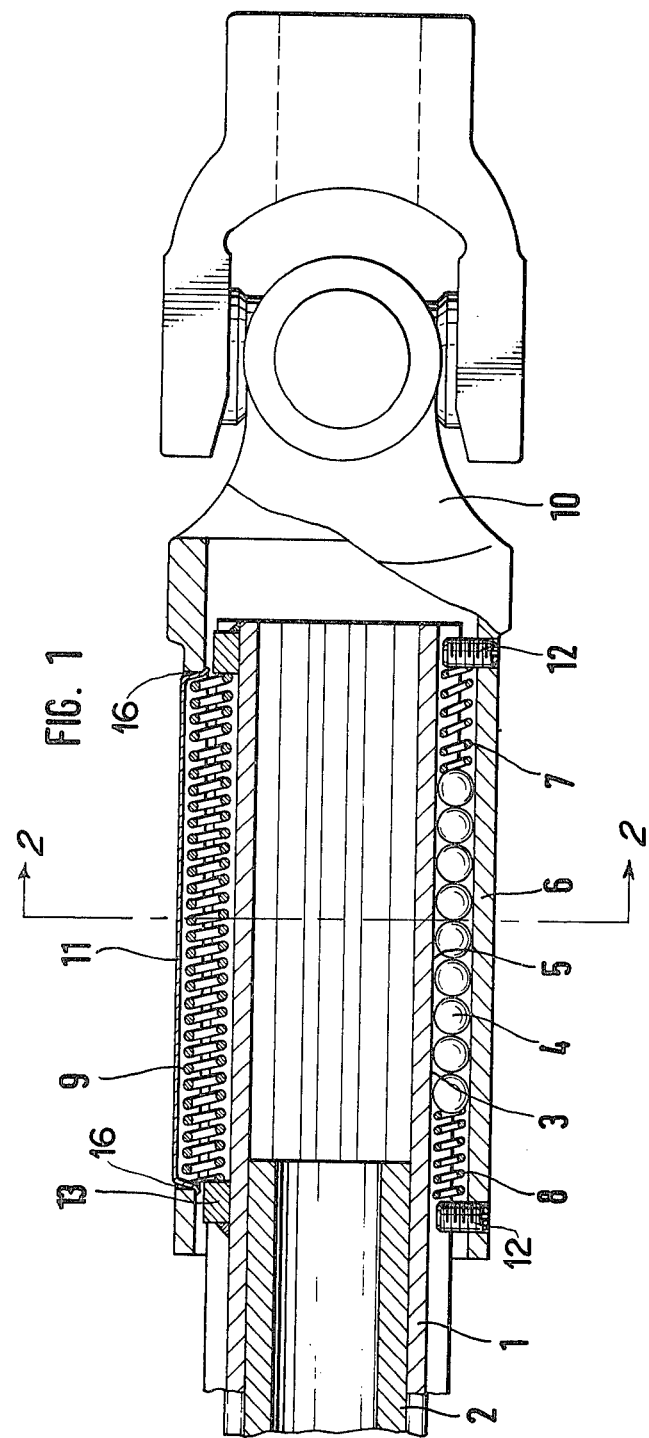

United States Patent [19]

Grosse-Entrup

[11] 4,103,514
[45] Aug. 1, 1978

[54] TELESCOPING TORQUE TRANSMITTING SHAFT

[75] Inventor: Hubert Grosse-Entrup, Lohmar, Germany

[73] Assignee: Jean Walterscheid GmbH, Lohmar, Germany

[21] Appl. No.: 707,106

[22] Filed: Jul. 20, 1976

[30] Foreign Application Priority Data

Jul. 22, 1975 [DE] Fed. Rep. of Germany ....... 2532661

[51] Int. Cl.² .................................................. F16D 3/06
[52] U.S. Cl. ..................................... 64/23.7; 308/6 R
[58] Field of Search ..................... 64/23, 23.7, 21, 9 A, 64/9 R; 308/6

[56] References Cited

U.S. PATENT DOCUMENTS

| 2,371,330 | 3/1945 | Irstad | 64/23 |
| 2,772,547 | 12/1956 | Nolan | 64/23 |
| 3,118,291 | 1/1964 | Berglund | 64/23.7 |
| 3,808,839 | 5/1974 | Teramachi | 64/23.7 |

FOREIGN PATENT DOCUMENTS 1,228,149  3/1959  France ........................... 64/23.7

Primary Examiner—Samuel Scott
Assistant Examiner—Gerald Anderson
Attorney, Agent, or Firm—Edmund M. Jaskiewicz

[57] ABSTRACT

A telescoping torque transmitting shaft has an outer shaft element non-rotatably and slidably mounted upon an inner shaft element and both shaft elements have conforming cross-sections. A tubular shaft is concentrically arranged about the outer shaft element and the opposing surfaces of the tubular shaft and the outer shaft element are provided with axially extending grooves in which are positioned a plurality of linearly arranged torque transmitting balls. Springs are mounted on the tubular shaft to limit the axial movement of the balls in each groove and a restoring spring biases the tubular shaft and the outer shaft element to a predetermined axial position with respect to each other.

6 Claims, 2 Drawing Figures

TELESCOPING TORQUE TRANSMITTING SHAFT

The present invention relates to a telescoping torque transmitting shaft, more particularly, to such a shaft wherein the friction between the relatively slidable components is kept low under high torque loads.

Telescoping torque transmitting shafts are largely used in agricultural machinery where they may be connected between the power take-off of a tractor and a machine or implement attached to the tractor and powered thereby. Such telescoping or sliding shafts have generally been provided with splined surfaces or non-circular cross-sections so as to transmit torque between the telescoping portions of the shaft but at the same time to enable these shaft portions to be slidable with respect to each other. Such telescoping shafts have the distinct disadvantage in that under high torque loads and particularly under peak torque loads the non-circular sectioned tubular shaft elements may become wedged with respect to each other and subsequently may break.

It has also been proposed to provide a ball guide mechanism for telescoping torque transmitting shafts wherein the ball guide mechanism comprised rotatable balls which are effective over the entire distance of the relative sliding displacement between the shaft elements. However, such a structure had the disadvantage that it was expensive to manufacture and in many cases required an additional component in the form of an intermediate sleeve member, depending upon the length of the relative sliding displacement between the universal joint and the ball guide mechanism.

It was discovered that particularly in agricultural machinery, the major axial displacements between the shaft elements tended to occur under relatively low torque loads which were generally present when the machinery was being turned in order to change the working direction of the implement.

It is therefore the principal object of the present invention to provide a novel and improved telescoping torque transmitting shaft wherein the friction between the slidable shaft elements is low under high torque loads.

It is another object of the present invention to provide such a telescoping torque transmitting shaft which is relatively inexpensive to manufacture, is effective in operation, simple in structure but does not decrease the distance of the axial displacement between the slidable shaft elements.

According to one aspect of the present invention a telescoping torque transmitting shaft may comprise a first shaft having an outer element non-rotatably and slidably mounted upon an inner element. The outer element is provided with a plurality of axially extending circumferentially spaced grooves which correspond in plurality to axially extending circumferentially spaced grooves formed in a tubular second shaft co-axially positioned over the outer elements. The grooves in the tubular shaft and the outer element define pairs of opposed grooves and a plurality of roller elements are linearly disposed in each pair of opposed grooves. First spring means are mounted on the second shaft to limit the axial movement of the roller elements in each pair of opposed grooves. Second spring means act between the second shaft and the outer element for biasing the second shaft and the outer element to a predetermined axial position with respect to each other.

A torque transmitting shaft according to the present invention has the advantage in that any wedging which may occur between the inner and outer shaft elements under conditions of high torque transmission will not be damaging since any variation of length in the transmission shaft which may be required will be provided by axial displacement between the tubular shaft and the outer shaft element. The torque transmitting elements between the tubular shaft and the outer shaft element will not become wedged when transmitting high torques and the relative axial movement between the tubular shaft and outer shaft element will be readily accommodated by a rolling of these balls as compared to the sliding of the contacting surfaces of the inner and outer shaft elements.

Figure 2:
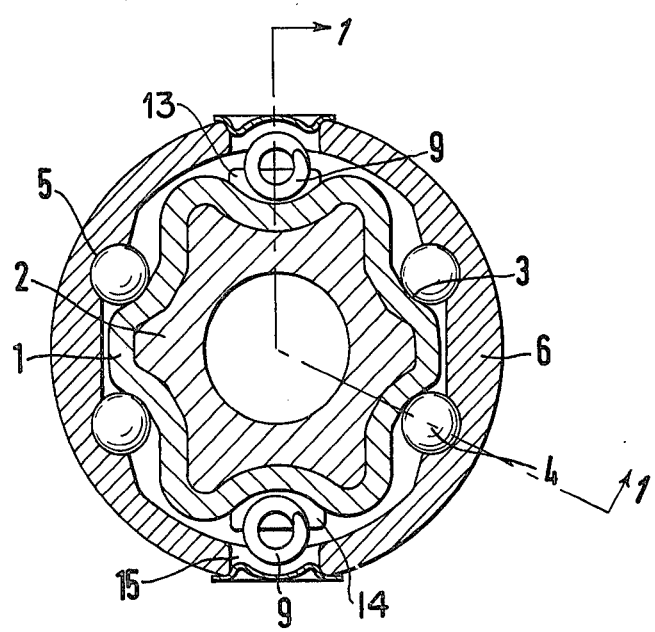

Other objects and advantages of the present invention will be apparent upon reference to the accompanying description when taken in conjunction with the following drawings, which are exemplary, wherein;

FIG. 1 is a longitudinal sectional view of a telescoping torque transmitting shaft according to the present invention and taken along the line 1—1 of FIG. 2; and, FIG. 2 is a sectional view taken along the line 2—2 of FIG. 1.

Proceeding next to the drawings wherein like reference symbols indicate the same parts throughout the various views a specific embodiment and modifications of the present invention will be described in detail.

As may be seen in FIGS. 1 and 2, an outer shaft element 1 is slidably and telescopingly mounted upon an inner shaft element 2 which may be rigidly secured to a joint member not shown in the drawings. The inner shaft element 2 has a profiled or non-circular cross-section, such as may be seen in FIG. 2, and the outer shaft element 1 has a correspondingly shaped cross-section which conforms to the cross-section of element 2. The outer shaft element 1 is provided with a plurality of axially extending circumferentially spaced grooves or guide tracks 3 in each of which is positioned a plurality of torque transmitting balls 4 linearly arranged and also received in a corresponding plurality of axially extending circumferentially spaced grooves 5 formed in the inner wall of a tubular shaft 6. The tubular shaft 6 has one end rigidly attached to a yoke member 10 of a universal joint as may be seen in FIG. 1.

On both ends of each row of balls 4 in each pair of opposed grooves in tubular shaft 6 and outer shaft element 1 are alignment control springs 7 and 8 whose outer ends are supported against stops or pins 12 mounted in the tubular shaft 6.

A pair of restoring springs 9 are provided between end abutments 13 attached to the outer surface of the outer shaft element 1. About half the diameter portion of each end of a spring 9 projects against the abutments 13 and this portion of the spring 9 is received within a groove or spline 14 formed in the outer shaft element 1. The other halves of the ends of the springs 9 are received within a longitudinal slot 15 formed in the tubular shaft 6 and corresponds in length to the distance between the stops 13. The ends of the springs 9 act against surfaces 16 of the ends of the slot 15. A cover plate 11 closes the aperture 15 and a spring 9 therein from the outside.

In normal operation when little or no torque is being transmitted the outer and inner shaft elements 1 and 2 will slide axially one within the other to provide for any required variations of length of the torque transmitting shaft. Torque will be transmitted from the outer shaft element 1 through the balls 4 and to the tubular shaft 6 which is non-rotatably attached to the yoke 10.

Under high torque loads and as peak torque loads are approached the friction between the telescoping outer and inner shaft members 1 and 2 will increase to such a degree that these elements will lock with respect to one another and will thus be incapable of adjusting for any length variations in the transmission shaft. Increasing axial or thrust forces will then overcome the forces exerted by the restoring springs 9 and variations of length in the transmission force will be adjusted by rolling movement of the balls 4 between the tubular shaft 6 and the outer shaft element 1. Each ball 4 will roll over a distance equal to approximately half of the distance of the relative axial displacement between tubular shaft 6 and outer shaft element 1. This axial movement is limited by the pins 12 and the control springs 7 and 8. The balls 4 will roll within the grooves 3 and 5 of the outer shaft element 2 and tubular shaft 6 respectively.

During relative axial displacement of the components 1 and 6, the springs 9 are loaded and the control springs 7 and 8 tend to push the balls 4 into a central position between the pins 12. As a result, when a torque peak occurs the full lengths of the grooves 5 may be utilized in absorbing axial loads to protect the transmission shaft against damage. It is to be noted that since only the restoring springs 9 are subject to thrust loads resulting from length variation at peak torques, the alignment springs 7 and 8 under their inherent spring force and under the influence of the oscillating torque transmission will always act to push the balls 4 into a central position.

It has been found that the peak of torque transmission will occur only for comparatively brief periods of time and during these periods the variation of length of the transmission shaft is relatively short. Accordingly, the ball guide structure associated with the outer shaft element 1 and tubular shaft 6 need not be of a great length.

In comparison with previously known telescoping torque transmitting shafts the shaft of the present invention has the advantage that no intermediate tubular member is required between the tubular shaft and the yoke of the joint to accommodate relative axial displacement of the telescoping shaft members. The length required for major adjustments of length can be made available in the connection between the outer and inner shaft elements. This means a considerable savings in costs of production, both with respect to labor and to materials.

It will be understood that this invention is susceptible to modification in order to adapt it to different usages and conditions, and accordingly, it is desired to comprehend such modifications within this invention as may fall within the scope of appended claims.

What is claimed is:

1. A telescoping torque transmitting shaft comprising a first shaft having an inner element and an outer element non-rotatably and slidably mounted thereon, said outer element having a plurality of axially extending circumferentially spaced grooves therein and on, a tubular second shaft co-axially positioned on said outer element and having a plurality of axially extending circumferentially spaced grooves corresponding in plurality to said outer element grooves to define pairs of opposed grooves, a plurality of roller elements linearly disposed in each said pair of opposed grooves, first spring means on said second shaft for limiting the axial movement of the roller elements in each pair of opposed grooves, and second spring means acting between both said second shaft and said outer element of the first shaft for biasing said second shaft and said outer element to a predetermined axial position with respect to each other said second shaft is attached to a yoke member of a universal joint.

2. A telescoping torque transmitting shaft as claimed in claim 1 wherein said inner element has a non-circular cross-section and said outer element has a cross-section conforming thereto.

3. A telescoping torque transmitting shaft as claimed in claim 1 wherein said roller elements comprise balls.

4. A telescoping torque transmitting shaft as claimed in claim 1 wherein said first spring means comprises two springs at both ends of a ball carrying groove and the balls in the groove being between said two springs.

5. A telescoping torque transmitting shaft as claimed in claim 1 wherein said second spring means is axially disposed.

6. A telescoping torque transmitting shaft as claimed in claim 5 wherein said second spring means comprises a spring having two ends and a portion of each end acting against said second shaft and a further portion of each spring end acting upon said outer element.

* * * * *